US007699053B1

(12) United States Patent
Johnson et al.

(10) Patent No.: US 7,699,053 B1
(45) Date of Patent: Apr. 20, 2010

(54) POWERED AIR-PURIFYING RESPIRATOR SYSTEM

(75) Inventors: Douglas V. Johnson, Prospect, KY (US); Shaun D. Johnson, Shelbyville, KY (US)

(73) Assignee: E.D. Bullard Company, Cynthiana, KY (US)

( * ) Notice: Subject to any disclaimer, the term of this patent is extended or adjusted under 35 U.S.C. 154(b) by 942 days.

(21) Appl. No.: 11/303,211

(22) Filed: Dec. 16, 2005

(51) Int. Cl.
*F16K 31/02* (2006.01)

(52) U.S. Cl. ............................ 128/204.23; 128/200.24; 128/202.22; 128/204.18; 128/204.21; 128/204.26

(58) Field of Classification Search ............ 128/200.24, 128/202.22, 204.18, 204.21, 204.23, 204.26
See application file for complete search history.

(56) References Cited

U.S. PATENT DOCUMENTS 3,569,784 A 3/1971 Carroll et al.
3,921,005 A 11/1975 Watrous
3,949,271 A 4/1976 Nercessian
4,090,123 A 5/1978 Kiviranna
4,122,400 A 10/1978 Medendorp et al.
4,126,237 A 11/1978 Downing et al.
4,193,104 A 3/1980 Nercessian
4,356,543 A 10/1982 Reynolds
4,470,046 A 9/1984 Betsill
4,598,338 A 7/1986 Van Devender et al.
4,800,974 A 1/1989 Wand et al.
5,008,798 A 4/1991 Harvey
5,202,811 A 4/1993 Minks
5,671,730 A * 9/1997 Ollila .................... 128/204.21

(Continued)

FOREIGN PATENT DOCUMENTS

JP 2003299260 10/2003

OTHER PUBLICATIONS

FM Global Technologies L.L.C., "Approval Standard for Intrinsically Safe Apparatus and Associated Apparatus for Use in Class I, II, & III, Division 1, and Class I, Zone 0 & 1 Hazardous (Classified) Locations," FM Approvals, Class No. 3610, Oct. 1999, pp. 1-82.

(Continued)

*Primary Examiner*—Patricia M Bianco
*Assistant Examiner*—Nihir Patel
(74) *Attorney, Agent, or Firm*—Stites & Harbison PLLC; Jeffrey A. Haeberlin; David W. Nagle, Jr.

(57) ABSTRACT

Disclosed is an apparatus and method for operating powered air-purifying respirators safely in explosive atmospheres. The apparatus and method utilize a current control means for sensing a current flow from a battery to a motor, and stopping the current flow when the current flow exceeds a threshold value for a predetermined amount of time. Upon sensing that the current flow has exceeded the threshold value for the predetermined amount of time, the current control means immediately stops the current flow. The apparatus and method provides sufficient power to properly start and operate the motor by providing a soft start to the motor by limiting the duration of higher than threshold operating current to intervals shorter than the predetermined amount of time. Pulse width modulation is used to ramp-up the motor to speed by supplying pulses of energy to the motor that will not cause the current control means to stop the current flow.

4 Claims, 6 Drawing Sheets

U.S. PATENT DOCUMENTS

| | | | | |
|---|---|---|---|---|
| 5,883,775 | A | 3/1999 | Maytum | |
| 5,950,621 | A * | 9/1999 | Klockseth et al. ...... | 128/204.26 |
| 6,289,890 | B1 * | 9/2001 | Bliss et al. ............. | 128/203.11 |
| 6,300,750 | B1 | 10/2001 | Oglesbee et al. | |

OTHER PUBLICATIONS

Hohenstein, “Intrinsic Safety Points to the Future,” Process Instrumentation & Control, Jun. 2003, pp. PS18- PS20.
Hohenstein, “Intrinsic safety in a nutshell,” InTech Tutorial, Dec. 2002, pp. 64-65.
Abb, “Hazardous Environment—Motors for Hazardous Areas” and “US Standards—Motors for Hazardous Areas,” 2005, downloaded at http://www.abb.com/.
Underwriters Laboratories Inc., “Overview of Potentially Explosive Atmospheres (ATEX) Directives,” three pages downloaded at http://www.ul.com/hazioc/potential.htm on Sep. 21, 2005.
IPROCESSMART.COM, “Electrical Equipment and Safety Standards,” four pages downloaded at http://www.iprocessmart.com/techsmart/tech_standards.htm on Sep. 22, 2005.
Europa, “Equipment Intended for Use in Potentially Explosive Atmospheres (ATEX),” downloaded at http://europa.eu.int/comm/enterprise/atex/index_en.htm.
Texas Instruments, “TPS2330, TPS2331 Single Hot-Swap Power Controllers With Circuit Breaker and Power-Good Reporting” data sheet, Sep. 2001, pp. 1-22.
Texas Instruments, “A Step-By-Step Design Approach to TPS2300/01/11/20/21/30/31Hotswap Controllers,” Application Report, May 2003, pp. 1-15.
International Rectifier, IRF7401" Hexfet Power MOSFET Data Sheet, Feb. 13, 2001, pp. 1-9.
David Johnson and Associates, “D-Flip/Flop One-Shot Circuits”, Dec. 18, 2004, one page.
David Johnson and Associates, “CD4013 One-Shot and Latch Circuits”, Mar. 26, 2002, one page.
Fairchild Semiconductor Corporation, “CD4013BC Dual D-Type Flip-Flop” data sheets, Mar. 2002, pp. 1-7.
National Semiconductor Corporation, “LP2950/LP2951 Series of Adjustable Micropower Voltage Regulators” data sheets, May 2005, pp. 1-26.
Microchip Technology Inc., PIC16F818/819 Data Sheet, Sep. 27, 2004, pp. i-174.
Dallas Semiconductor, “MAX1780 Advanced Smart Battery Pack Controller” data sheet, Mar. 5, 2003, pp. 1-2, downloaded at http://www.maxim-ic.com/quick_view2.cfm/qv_pk/2417/ln/en on Nov. 30, 2004.
Dallas Semiconductor, “MAX1660 Digitally Controlled Fuel-Gauge Interface” data sheet, Oct. 1, 1998, pp. 1-2, downloaded at http://www.maxim-ic.com/quick_view2.cfm/qv_pk/17937/ln/ on Nov. 30, 2004.
Dallas Semiconductor, “MAX4210, MAX4211 High-Side Power and Current Monitors” data sheet, Jun. 21, 2004, pp. 1-3, downloaded at http://www.maxim-ic.com/quick_view2.cfm/qv_pk/4303 on Jan. 10, 2005.
Aloisi et al., “Paralleling UCC3912 Electronic Circuit Breaker ICs”, Unitrode Design Note 68, Jun. 1995, pp. 1-4.
Dallas Semiconductor, “High-Side Current-Sense Measurement: Circuits and Principles”, Mar. 26, 2001, pp. 1-14, Application Note A232.

* cited by examiner

POWERED AIR-PURIFYING RESPIRATOR SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

The present invention relates to powered air-purifying respirators (PAPRs). More particularly, the invention relates making PAPRs safe for use in explosive atmospheres.

2. Description of Prior Art

Air purifying respirators have an air-purifying filter, cartridge, or canister that removes specific air contaminants by passing ambient air through the air-purifying element. Powered air-purifying respirators (PAPRs) are air-purifying respirators that use a battery (preferably a rechargeable battery) to supply power to a blower to force ambient air through an air-purifying element to a headpiece. The headpiece forms a protective barrier between the user's respiratory tract and the unfiltered ambient air. The objective of such respirators is to protect the health of the user and to control diseases caused by breathing air contaminated with harmful dusts, fogs, fumes, mists, gases, smokes, sprays or vapors.

However, dusts and gases often create an explosive atmosphere, in addition to the respiratory issues described above. Equipment for such explosive atmospheres must be designed, installed, operated and maintained according to certain additional standards and regulations. Battery powered equipment, such as a PAPR, is of particular concern in areas that have an explosive atmosphere because batteries are a potential source of ignition energy in an explosive atmosphere. This is because batteries produce power by chemical reactions that are capable of delivering large amounts of energy in relatively short periods of time. For instance, a standard AAA-size 1.2 volt Ni-Cad battery stores about 250 milliamp hours of energy (about 1080 joules). Such a battery is capable of discharging around 6.5 amps at 1.2 volts (7.2 joules/sec) when short circuited, which is more than enough energy to ignite an explosive atmosphere. Thus, battery powered equipment for use in explosive atmospheres must have designs that address the battery as a potential source of ignition energy.

Historically, PAPRs have been made safe for use in explosive atmospheres by using a resistor circuit in series with the battery to limit the current (power) flow to a level lower than required for creating a spark capable of igniting the explosive atmosphere. Even in a short circuit, the resistor circuit would limit the current (power) flow from the battery to a level less than required to create an ignition of the explosive atmosphere.

However, while the resistor circuit does provide a solution for making PAPRs safe, several problems exist with the use of such circuits. For example, the resistors consume power even under normal operation of the PAPR, and, thus, reduce the length of time that the battery pack can power the blower before requiring recharging or replacement. Further, the resistor circuit drops the voltage available to the blower motor, which for a DC motor will decrease the speed of the motor and the volume of air forced through the air-purifying element to the headpiece. Still further, it is desired to use batteries that will supply power to a PAPR for a reasonable amount of time, such as four hours, to reduce the frequency of battery changes. Such batteries are larger and have a larger amp-hour capacity, also increasing the physical size of the resistors needed to limit the power flow. The increased size of the resistors poses problems for designers that wish to combine the battery and the resistor circuits in a single battery unit or "battery pack." Even further yet, increases in the power capacity of the batteries and the size of the resistors also results in increased heat that must be dissipated by the battery and the battery pack during a short circuit event, which also poses additional design challenges. Thus, there is a need for an improved solution for making PAPRs safe for use in explosive atmospheres.

Further, any improved solution for making PAPRs safe for use in explosive atmospheres must also provide sufficient power to properly start and operate the blower of the PAPR.

BRIEF SUMMARY OF THE INVENTION

The present invention meets the aforementioned needs, and others, by utilizing an improved current control means for making PAPRs safe for use in explosive environments. The improved current control means senses a current flow from a battery to a blower, and stops the current flow when it exceeds a threshold value for a predetermined amount of time, making the PAPR incapable of igniting an explosive atmosphere. Stopping the current flow under such circumstances is referred to as a "trip event."

The invention also provides sufficient power to properly start and operate a blower of a PAPR. Blower motors starting from a stopped state require relatively high current/power levels to initiate spinning and to spin up to operating speed. This relatively high current level will cause a trip event, so there must be a mechanism in place that will allow the blower motor to start without causing a trip event. In one embodiment, the invention utilizes pulse width modulation (PWM) to ramp the motor up to speed by supplying power/current to the motor in pulses that will not cause a trip event.

DETAILED DESCRIPTION OF EXEMPLARY EMBODIMENTS OF THE INVENTION

Figure 1:
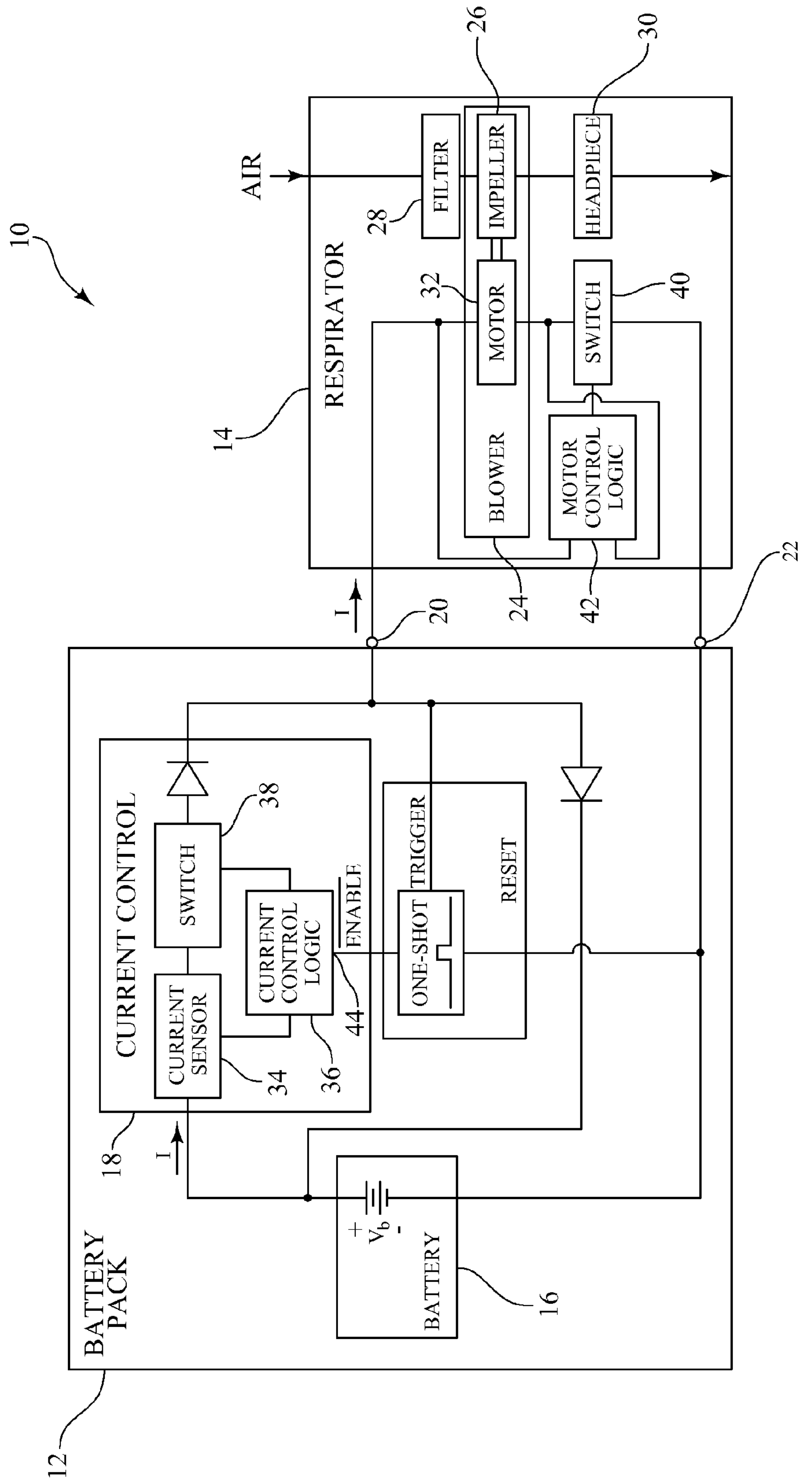
FIG. 1 is a block diagram of a powered air-purifying respirator system, according to the invention.

As shown in FIG. 1, an exemplary powered air-purifying respirator system 10 includes a battery pack 12 and a respirator unit 14. The battery pack 12 has a battery 16, a current control means 18, a positive battery pack terminal 20 and a negative battery pack terminal 22. The respirator unit 14 has a blower 24. The blower 24 includes an impeller 26 for pulling air through a filter 28 and pushing the filtered air to a headpiece 30, and a motor 32 in electrical communication with the battery 16 for driving the impeller 26. The current control means 18 is for sensing the current flow, I, from the battery 16 to the motor 32 and stopping the current flow when it exceeds a threshold value, $I_{thresh}$, for a predetermined amount of time, $t_p$. One of skill in the art will recognize that the current flow is directly proportional to power flow in this DC circuit, since it is assumed that the voltage of the battery is substantially constant. Thus, the current flow, I, has a corresponding power flow, P; the current flow threshold value, $I_{thresh}$, has a corresponding power flow threshold value, $P_{thresh}$; and stopping the current flow will also stop the power flow. Stopping the current flow when it exceeds a threshold value, $I_{thresh}$, for a predetermined amount of time, $t_p$, is referred to as a "trip event."

Figure 2:
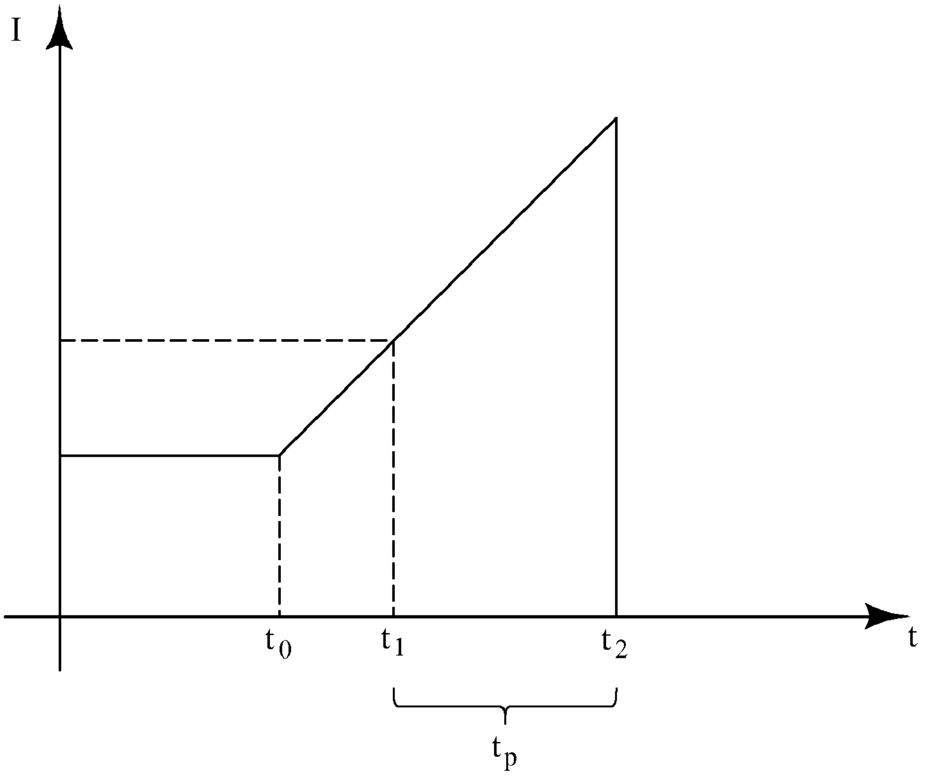
FIG. 2 is a current flow graph for a trip event.

FIG. 2 is a current flow graph for a representative trip event. As shown in the graph, a fault somewhere in the system causes the current flow, I, to increase at time $t_0$. At time $t_1$, the current flow exceeds a threshold value, $I_{thresh}$. If the current flow exceeds the threshold value, $I_{thresh}$, for a predetermined amount of time, $t_p$, the current control means 18 (FIG. 1) stops the current flow, I. If the current flow returns to a level below $I_{thresh}$ before the predetermined amount of time, the current control means will allow the current to continue flowing and avoid a trip event.

Returning to FIG. 1, in the exemplary PAPR system 10 shown, the current control means 18 has a current sensor 34, a current control logic means 36, and a current control switch means 38. The current sensor 34 is for sensing the current flow, I, and providing corresponding sensor output to the current control logic means 36. The current control logic means 36 is for receiving the current flow information from the current sensor 34 and generating a control signal for stopping the current flow when the current flow exceeds a threshold value, $I_{thresh}$, for a predetermined amount of time, $t_p$. The current control switch means 38 is for stopping the current flow, I, in response to receiving the control signal from the current control logic means 36.

The respirator 14 has a motor control switch means 40 for switching power to the motor 32, and a motor control logic means 42 for controlling the motor control switch means 40. The motor control switch means 40 and motor control logic means 42 regulate power to the motor 32. Additionally, the motor control switch means 40 and motor control logic means 42 provide a "soft start" to the motor, such that the motor 32 will not cause a trip event on start-up when the motor draws a relatively high "in-rush" current. In an exemplary embodiment, motor control logic means 42 is a pulse width modulator means using pulse width modulation and the motor start-up characteristics to ramp the motor 32 up to speed by supplying power/current to the motor in pulses that will not cause a trip event. As the motor ramps up to speed, the magnitude of the current in each pulse will decrease until the magnitude of the current is below $I_{thresh}$.

Figures 3A, 3B, 3C:
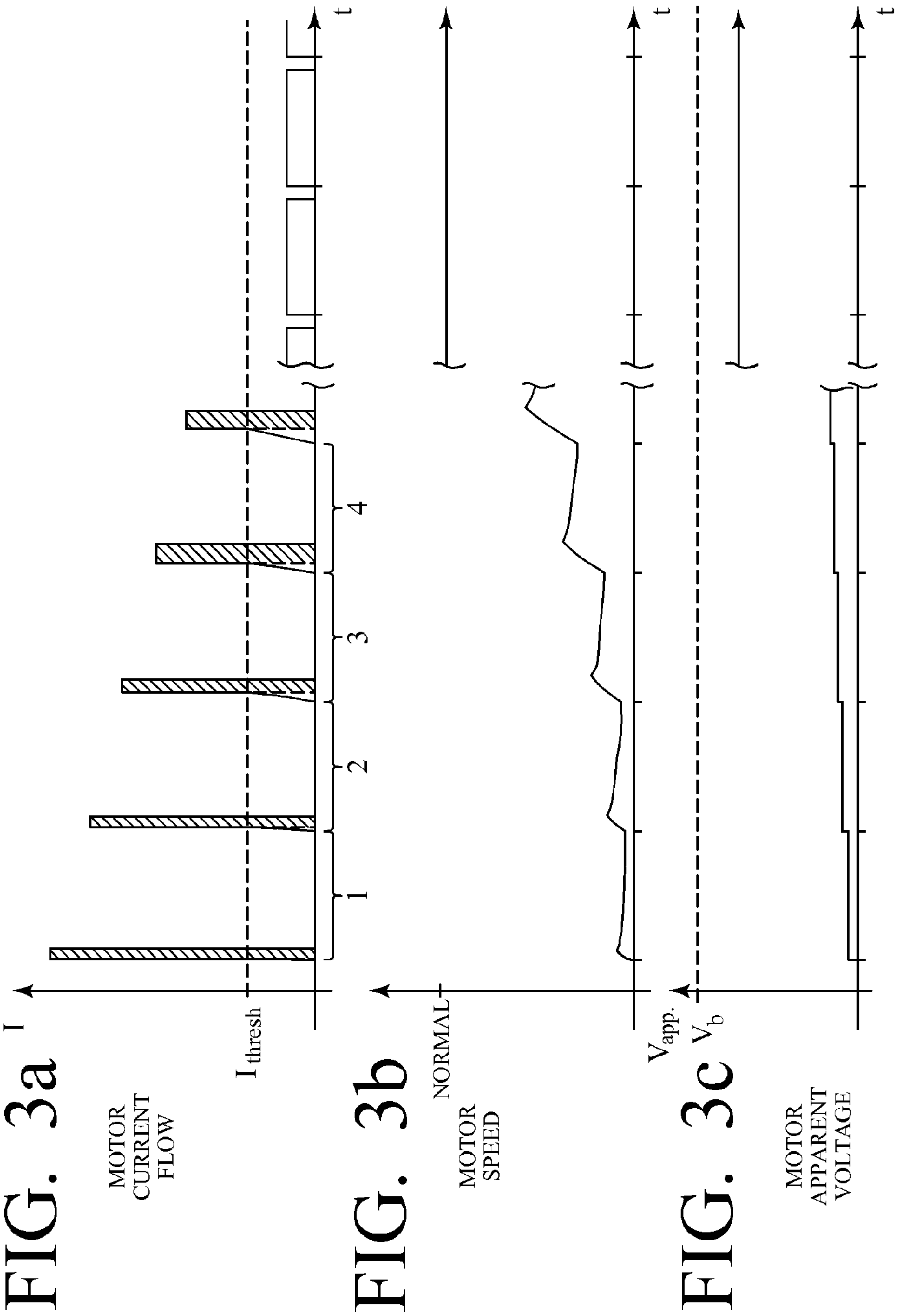
FIG. 3*a* is a timing diagram of motor current flow during operation of a motor according to an embodiment of the invention.
FIG. 3*b* is a timing diagram of motor speed during operation of a motor according to an embodiment of the invention.
FIG. 3*c* is a timing diagram of motor apparent voltage during operation of a motor according to an embodiment of the invention.

FIGS. 3*a*-3*c* show the effect of pulse width modulation in operation of a motor. In the first period, motor in-rush current will be higher than $I_{thresh}$ almost immediately as the motor begins turning from a dead stop. However, the pulse width (duty cycle) of the pulse is selected such that the current flow does not exceed $I_{thresh}$ longer than the predetermined amount of time, $t_p$, in order to avoid a trip event. The motor will begin spinning and a small apparent voltage will be observed by the motor. In the exemplary embodiment, the motor start-up characteristics and the pulse width (duty cycle) of the pulse is predetermined such that the energy transfer of the pulse is less than the amount capable of igniting an explosive atmosphere. The motor control logic means 42 is programmed with the pulse width information.

In the second period, the motor will still draw current higher than $I_{thresh}$ but the magnitude of the current will not be as great since the motor is already spinning. Thus, the duty cycle can be increased slightly while still maintaining an energy transfer level less than the amount capable of igniting an explosive atmosphere and a current flow that does not exceed $I_{thresh}$ for longer than $t_p$.

This pattern continues until the motor spins up to speed and the magnitude of the current flow falls to a level less than $I_{thresh}$. Advantageously, pulse width modulation can continue to be used to control the apparent voltage to the motor in a manner more efficient than a simple voltage regulator. In practice, a frequency of 60 kHz for the pulses may be utilized, and the ramp-up of the duty cycle and speed of the motor may occur over a time interval of a minute or more, such that the changes in duty cycle are much more gradual than those shown in FIG. 3*a*. Thus, the motor control logic means 42 uses pulse width modulation to prevent the energy transferred to the motor in each pulse from exceeding the amount capable of igniting an explosive atmosphere and the current flow from exceeding $I_{thresh}$ for longer than $t_p$, while also providing sufficient power to start and operate the motor.

Returning again to FIG. 1, the current control means 18 of the exemplary embodiment is also for latching the current control switch means 38 in the stopped state upon the occurrence of a trip event. The current control switch means 38 may be latched in the stopped state by the current control logic means 36 maintaining the control signal in a stopped condition. In one embodiment, the current control logic means 36 has an enable input 44 which must be toggled in order to reset the current control logic means 36. In the embodiment shown, the enable input 44 is active low, meaning that a logic "high" pulse must be received at the enable input 44 in order to reset the current control logic means 36.

Figure 4:
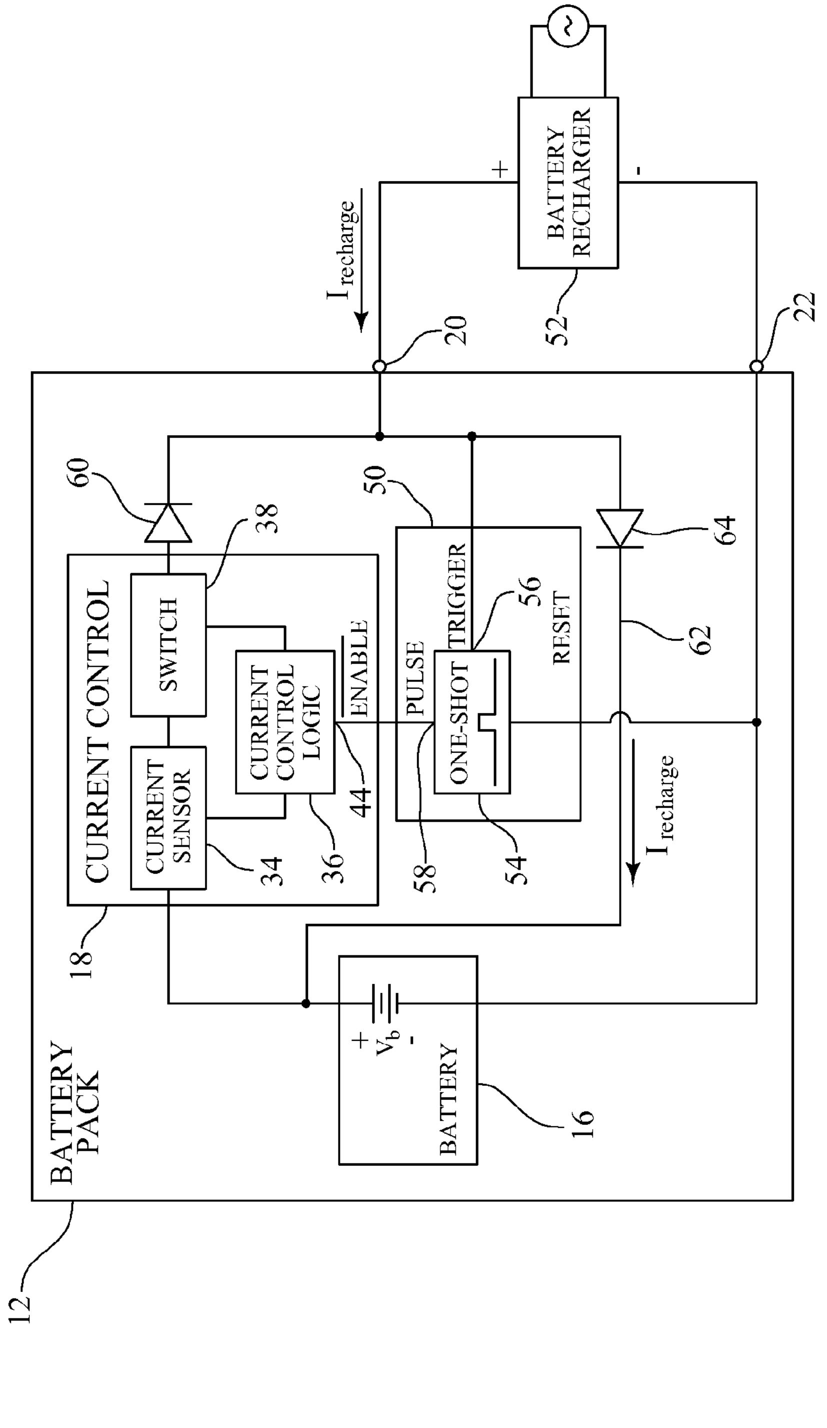
FIG. 4 is a block diagram of a battery pack of a PAPR connected to a battery recharger unit, according to the invention.

Turning now to FIG. 4, the battery pack 12 of the embodiment shown also includes a reset means 50 for resetting the current control logic means 36 in response to connection of the battery pack 12 to a battery recharger unit 52. As shown, the means 50 for resetting the current control logic means 36 is a one-shot circuit 54 having a trigger input 56 and a pulse output 58. The trigger input 56 is connected to positive battery pack terminal 20. The pulse output 58 is connected to the enable input 44 of the current control logic means 36.

Following a trip event, the battery pack 12 is removed from the PAPR respirator system 10, and connected to a battery recharger unit 52. Upon connection of the battery pack 12 to the battery recharger unit 52, the battery recharger unit 52 will trigger the one-shot circuit 54 to generate a logic "high" pulse at the pulse output 58, thereby resetting the current control logic means 36. The current control logic means 36 then resets the control signal such that the current control switch means 38 will allow current to flow when the battery pack 12 is reconnected to the respirator unit 14 (see FIG. 1).

The battery recharger unit 52 is normally for recharging the battery 16 following use of the battery 16. Thus, the battery pack 12 may also have a first diode 60, a recharging path 62, and a second diode 64. The first diode 60 is for preventing recharging current, $I_{recharge}$, from flowing through the current control means 18. The second diode 64 and the recharging path 62 are for allowing the recharging current, $I_{recharge}$, to by-pass the first diode 60 and the current control means 18 to recharge the battery 16.

Now, in operation, referring to FIG. 1 and FIG. 4, the current sensor 34 senses the current, flowing from the battery 16 to the motor 32, and provides current flow information to the current control logic means 36. The motor control logic means 42 controls the motor control switch means 40 to regulate power to the motor 32 and to provide a soft start to the motor such that the motor will not cause a trip event on start-up.

In a trip event, the current control logic means 36 detects that the current flow, I, has exceeded the current flow threshold value, $I_{thresh}$, for the predetermined amount of time, $t_p$. The current control logic means 36 generates a control signal to the current control switch means 38 to stop the current flow, I, before an amount of energy capable of igniting an explosive atmosphere is transferred.

The current control logic means 36 latches the control signal in the stopped state following the trip event, such that the battery pack 12 must be removed from the PAPR system and connected to a battery recharger unit 52 to be reset. Connecting the battery pack 12 to the battery recharger unit 52, causes the one-shot circuit 54 to generate a pulse to reset the current control logic means 36. Following reset, the battery pack 12 may be returned to the PAPR system 10.

Figure 5:
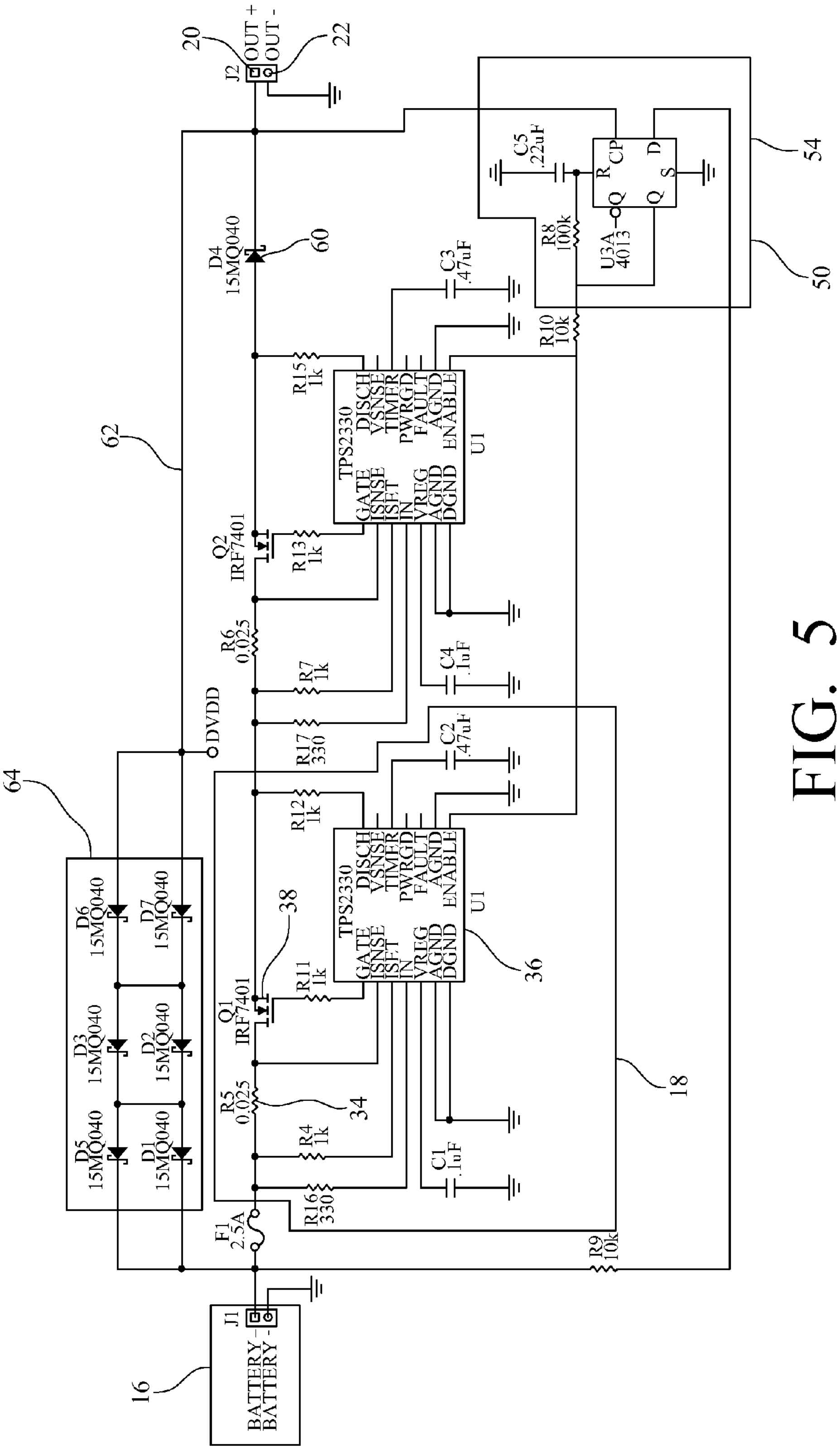
FIG. 5 is a circuit diagram of a current control means and a means for resetting the current control means, according to the invention.

FIG. 5 is a circuit diagram of an exemplary current control means 18 and a reset means 50 for resetting the current control means 18. To provide increased reliability, the current control means 18 is provided in a redundant arrangement. Of note, every input to the current control means 18 is resistively coupled to the battery 16. For convenience, only one of the redundant circuits will be described in detail.

Thus, as shown, a MOSFET switch Q1 serves as the current control switch means 38. An exemplary MOSFET switch Q1 is a model IRF7401 HEXFET Current MOSFET, manufactured by International Rectifier, of El Segundo, Calif., and described in a specification sheet identified as PD-9.1244C, dated Feb. 13, 2001, the disclosure of which is hereby incorporated by reference.

A MOSFET driver U1 is the current control logic means 36. An exemplary MOSFET driver U1 is a model TPS2330 SINGLE HOT-SWAP POWER CONTROLLER WITH CIRCUIT BREAKER AND POWER-GOOD REPORTING, manufactured by Texas Instruments, of Dallas, Tex., and described in a specification sheet identified as SLVS277D—March 2000—Revised September 2001, the disclosure of which is hereby incorporated by reference. The MOSFET driver U1 provides circuit breaker control with programmable current limit and transient timer functions. The GATE pin connects to the gate connection of the MOSFET switch Q1. The current limit function utilizes voltage inputs ISENSE and ISET to detect the magnitude of the current through an external sense resistor R5. ISENSE in combination with ISET implements over-current sensing for GATE. ISET sets the magnitude of the current that generates an over-current fault through an external resistor R4 connected to ISET. An internal current source draws 50 μA from ISET. The voltage across the sense resistor R5 reflects the load current. Thus, the sense resistor R5 is the current sensor 34. An over-current condition is assumed to exist if the voltage at ISENSE is pulled below the voltage at ISET. A transient timer function is implemented by a capacitor C2 connected to the TIMER pin. The capacitor C2 sets the time during which the power switch Q1 can be in over-current before being latched off by the MOSFET driver U1. When the over-current protection circuits sense an excessive current, a constant current source is enabled which charges the capacitor C2 on TIMER. Once the voltage on TIMER reaches approximately 0.5V, the circuit breaker latch is set and the MOSFET switch Q1 is latched off. Thus, C2 determines the time to build the charge to 0.5V. Larger values of capacitance will increase the time to trip, and smaller values will shorten the time base. Power must be recycled or the ENABLE pin must be toggled to reset the MOSFET driver U1, and to turn the MOSFET switch Q1 on again. Advantageously, the MOSFET driver U1 and the MOSFET switch Q1 are very efficient devices which consume very little power and provide a high efficiency PAPR system 10 that is safe for use in explosive atmospheres.

Also shown in FIG. 5 is a D-flip/flop U3A and related components R8, R10 and C5, which create a one-shot circuit 54. An exemplary D-flip/flop U3A is a CD4013BC DUAL D-TYPE FLIP-FLOP, manufactured by Fairchild Semiconductor Corporation and described in a specification sheet identified as DS005946, October 1987, Revised March 2002, the disclosure of which is hereby incorporated by reference. The trigger input to the one-shot circuit is the CP (clock pulse) input on the D-flip/flop U3A. The CP input is connected to the positive battery pack terminal 20, such that when the one-shot circuit is connected to a battery recharger unit (not shown), the CP input will go high, generating a pulse at the Q output of the D-flip/flop, which acts as the pulse output of the one-shot circuit 54. The pulse output of the one-shot circuit 54 is connected to the ENABLE input of the MOSFET driver U1. The pulse generated at the output of the one-shot circuit 54 toggles the ENABLE pin of the MOSFET driver U1, which resets the MOSFET driver U1, which then turns the MOSFET switch Q1 on again.

Still further shown in FIG. 5 are: a diode D4, which acts as the first diode 60 for preventing recharging current, $I_{recharge}$, from flowing through the current control means 18; and diodes, D1, D2, D3, D5, D6, and D7, which, collectively, act as the second diode 64 for allowing the recharging current to by-pass the first diode 60 and the current control means 18 to recharge the battery. Multiple diodes D1, D2, D3, D5, D6, and D7 are utilized for this function to dissipate the heat and for component size considerations associated with a relatively large recharging current, $I_{recharge}$.

Figure 6:
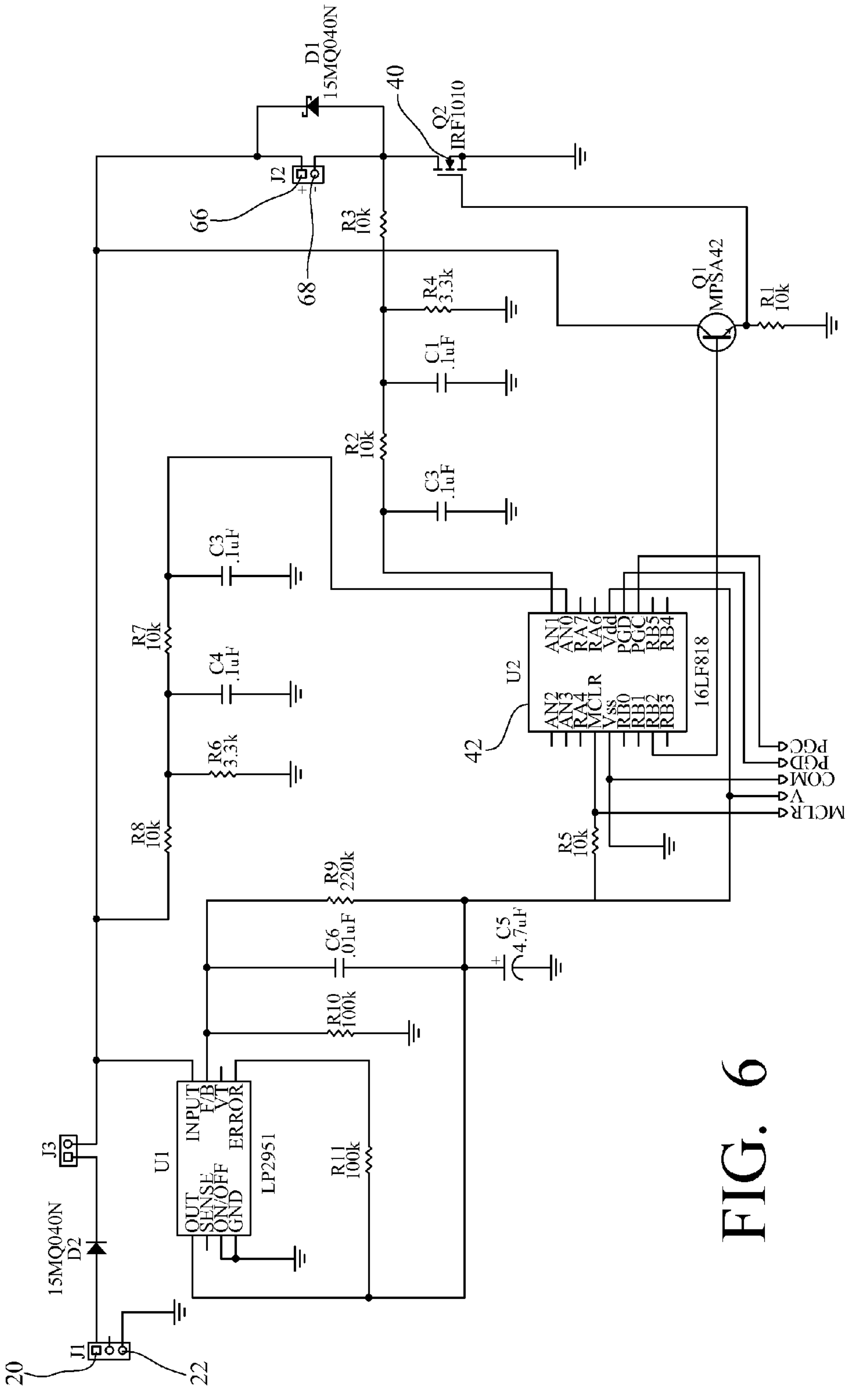
FIG. 6 is a circuit diagram of a motor control logic means and a motor control switch means, according to the invention.

FIG. 6 is a circuit diagram of an exemplary motor control logic means 42 and motor control switch means 40, according to the invention. Also shown are battery pack terminals 20, 22 and motor terminals 66, 68, for connecting the circuit to the battery pack 12 (not shown) and the motor 32 (not shown), respectively. A MOSFET switch Q2 acts as the motor control switch means 40. A microcontroller U2 having a pulse width modulation module acts as the motor control logic means 42. The microcontroller U2 is programmed for pulse width modulating the MOSFET switch Q2 to ramp the blower motor up to speed by supplying pulses of power/energy to the motor in amounts that will not cause a trip event. Once the blower motor is operating at the desired speed, the microcontroller U2 and MOSFET switch Q2 efficiently regulate power to the motor to maximize battery life and provide a consistent flow of air.

An exemplary microcontroller U2 is a model PIC16LF818 Microcontroller, manufactured by Microchip Technology Inc., of Chandler, Ariz., and described in a specification sheet identified as DS39598E, dated Sep. 27, 2004, the disclosure of which is hereby incorporated by reference. The microcontroller has a pulse width module. Inputs AN0 and AN1 sense the voltage applied across the motor M1. Output RB2 provides the pulse width modulation output signal, which is applied to MOSFET switch Q2 through transistor Q1.

Thus, the improvements described herein make PAPRs safe for use in an explosive atmosphere by utilizing a current control means for sensing the current flow from a battery to a blower of a PAPR. Upon sensing that the current flow has exceeded a threshold value, $I_{thresh}$, for a predetermined amount of time, $t_p$, the current control means immediately stops the current flow, thus making the PAPR incapable of igniting the explosive atmosphere. The improvement also provides sufficient power to properly start up and operate the blower of the PAPR utilizing pulse width modulation to ramp the blower motor up to normal speed while maintaining safety in the PAPR.

One of ordinary skill in the art will recognize that additional configurations are possible without departing from the teachings of the invention or the scope of the claims which follow. This detailed description, and particularly the specific details of the exemplary embodiments disclosed, is given primarily for completeness and no unnecessary limitations are to be imputed therefrom, for modifications will become obvious to those skilled in the art upon reading this disclosure and may be made without departing from the spirit or scope of the claimed invention.

What is claimed is:

1. A powered air-purifying respirator system comprising:

a battery pack having a battery and a current control means; and a respirator unit having a blower, said blower having an impeller for pulling air through a filter and pushing the filtered air to a headpiece, and a motor in electrical communication with said battery for driving said impeller;

a current sensor for sensing the current flow and providing corresponding sensor output;

a current control logic means for receiving said sensor output and generating a control signal when said current flow has exceeded the threshold value for said predetermined amount of time;

a current control switch means for stopping said current flow in response to receiving said control signal from said current control logic means; and a means for resetting the current control logic means in response to connection of said battery to a battery recharger unit;

wherein said current control means is for sensing a current flow from the battery to the motor and stopping the current flow when the current flow exceeds a threshold value for a predetermined amount of time;

wherein said current control logic means further provides for latching the control signal following a trip event such that said current control switch means stops the current flow until the current control logic means is reset;

wherein said current control logic means has an enable input which must be toggled to reset the current control logic means following the trip event;

wherein said battery pack further has a positive battery pack terminal in electrical communication with a positive terminal of said battery, and a negative battery pack terminal in electrical communication with a negative terminal of said battery; and wherein said means for resetting is a one-shot circuit having a trigger input and a pulse output, said trigger input connected to said positive battery pack terminal, said pulse output connected to said current control logic means enable input, said one-shot circuit generating a pulse on said pulse output in response to connecting said positive battery pack terminal and said negative battery pack terminal to said battery recharger unit.

2. A battery pack for use with a powered air-purifying respirator, said battery pack comprising:

a rechargeable battery;

a current control means for stopping a current flow from said battery in response to a trip event wherein the current flow exceeds a threshold value for a predetermined amount of time, and latching in the stopped state until reset following the trip event, said current control means including a current sensor for sensing the current flow and providing corresponding sensor output, a current control logic means for receiving the sensor output and generating a control signal when said current flow has exceeded the threshold value for said predetermined amount of time, and a current control switch means for stopping said current flow in response to receiving said control signal from said current control logic means; and means for resetting the current control means in response to connection of the battery pack to a battery recharger unit;

wherein said current control logic means has an enable input which must be toggled to reset the current control means following the trip event;

wherein said battery pack further has a positive battery pack terminal in electrical communication with a positive terminal of said battery, and a negative battery pack terminal in electrical communication with a negative terminal of said battery; and wherein said means for resetting is a one-shot circuit having a trigger input and a pulse output, said trigger input connected to said positive battery pack terminal, said pulse output connected to said current control logic means enable input, said one-shot circuit generating a pulse on said pulse output in response to connecting said positive battery pack terminal and said negative battery pack terminal to said battery recharger unit.

3. The battery pack of claim 2, wherein said current control logic means has a timer function for setting the predetermined amount of time.

4. The battery pack of claim 3, wherein said current control logic means is a MOSFET driver, wherein said current sensor is a resistor, and wherein said current control switch means is a MOSFET switch.

* * * * *